(12) United States Patent
Ponsolle et al.

(10) Patent No.: US 9,902,118 B2
(45) Date of Patent: Feb. 27, 2018

(54) RESIN-SOLUBLE VEILS FOR COMPOSITE ARTICLE FABRICATION AND METHODS OF MANUFACTURING THE SAME

(71) Applicant: CYTEC TECHNOLOGY CORP., Wilmington, DE (US)

(72) Inventors: Dominique Ponsolle, Winona, MN (US); Robert Blackburn, Hull (GB); Billy Harmon, Simpsonville, SC (US); Richard Price, Corona, CA (US); Marc Doyle, Chester (GB)

(73) Assignee: CYTEC TECHNOLOGY CORP., Wilmington, DE (US)

( * ) Notice: Subject to any disclaimer, the term of this patent is extended or adjusted under 35 U.S.C. 154(b) by 570 days.

(21) Appl. No.: 14/566,072

(22) Filed: Dec. 10, 2014

(65) Prior Publication Data

US 2015/0091216 A1 Apr. 2, 2015

Related U.S. Application Data

(62) Division of application No. 13/307,383, filed on Nov. 30, 2011.
(Continued)

(51) Int. Cl.
*B29C 70/48* (2006.01)
*B29B 11/16* (2006.01)
(Continued)

(52) U.S. Cl.
CPC ............ *B29C 70/48* (2013.01); *B23K 26/382* (2015.10); *B29B 11/16* (2013.01); *B29C 43/24* (2013.01);
(Continued)

(58) Field of Classification Search
None
See application file for complete search history.

(56) References Cited

U.S. PATENT DOCUMENTS 7,252,729 B2 * 8/2007 Haque ................. B29C 70/18
156/148
2001/0031594 A1 * 10/2001 Perez ................... B32B 5/26
442/339
(Continued)

FOREIGN PATENT DOCUMENTS

WO WO-2010046609 A1 * 4/2010 ........... B29C 70/083

OTHER PUBLICATIONS

Pederson et al; "Epoxy-Soluble Thermoplastic Fibers: Enabling Technology for Manufacturing High Toughness Structures by Liquid Resin Infusion", SAMPE Journal, vol. 39, No. 4, pp. 22-28, Jul. 1 2003, Azusa CA (Year: 2003).*
(Continued)

*Primary Examiner* — Benjamin A Schiffman
(74) *Attorney, Agent, or Firm* — Thi Dang

(57) ABSTRACT

Embodiments of the invention are directed to resin-soluble thermoplastic veils for use in liquid resin infusion processes, methods of manufacturing resin-soluble thermoplastic veils for use in liquid resin infusion processes, and methods of manufacturing composite articles using resin-soluble thermoplastic veils for use in liquid resin infusion applications. The resin-soluble thermoplastic veils according to embodiments of the invention and of which function as a toughening agent in composites having the veil incorporated therein have improved characteristics including, but not limited to, increased uniformity and decreased thickness relative to prior art veils. These characteristics translate into improvements in the processing of a composite article including, but not limited to, a substantial or complete elimination in premature dissolution of the veil during cure. The resultant
(Continued)

composite article also realizes improvements including, but not limited to, distribution evenness of the toughening agent throughout the composite.

5 Claims, 10 Drawing Sheets

Related U.S. Application Data

(60) Provisional application No. 61/418,473, filed on Dec. 1, 2010.

(51) Int. Cl.
| | | |
|---|---|---|
| *B29C 47/00* | (2006.01) | |
| *C08J 5/24* | (2006.01) | |
| *D04H 1/4382* | (2012.01) | |
| *D04H 1/558* | (2012.01) | |
| *B29C 70/44* | (2006.01) | |
| *B32B 5/02* | (2006.01) | |
| *B32B 5/26* | (2006.01) | |
| *B29C 43/24* | (2006.01) | |
| *D01D 5/08* | (2006.01) | |
| *B23K 26/382* | (2014.01) | |
| *B29C 47/36* | (2006.01) | |
| *B29K 71/00* | (2006.01) | |
| *B29K 81/00* | (2006.01) | |
| *B29K 105/00* | (2006.01) | |
| *B29K 307/04* | (2006.01) | |

(52) U.S. Cl.
CPC ........ *B29C 47/0021* (2013.01); *B29C 70/443* (2013.01); *B32B 5/022* (2013.01); *B32B 5/26* (2013.01); *C08J 5/24* (2013.01); *D01D 5/08* (2013.01); *D04H 1/4382* (2013.01); *D04H 1/558* (2013.01); *B29C 47/364* (2013.01); *B29K 2071/00* (2013.01); *B29K 2081/06* (2013.01); *B29K 2105/256* (2013.01); *B29K 2307/04* (2013.01); *B32B 2250/20* (2013.01); *B32B 2250/42* (2013.01); *B32B 2260/023* (2013.01); *B32B 2260/046* (2013.01); *B32B 2262/0269* (2013.01); *B32B 2262/101* (2013.01); *B32B 2262/106* (2013.01); *B32B 2307/50* (2013.01); *B32B 2307/718* (2013.01); *Y10T 428/24273* (2015.01); *Y10T 442/609* (2015.04)

(56) References Cited

U.S. PATENT DOCUMENTS

| | | | | |
|---|---|---|---|---|
| 2005/0064166 | A1* | 3/2005 | Burrows | B29C 70/18 428/292.1 |
| 2006/0240242 | A1* | 10/2006 | Raghavendran | B32B 5/02 428/304.4 |
| 2006/0252334 | A1* | 11/2006 | LoFaro | B32B 5/022 442/400 |
| 2012/0015167 | A1* | 1/2012 | Beraud | B29C 70/083 428/216 |

OTHER PUBLICATIONS

ISR/Written Opinion for PCT/US2011/061297 dated Feb. 16, 2012 (Year: 2012).*

* cited by examiner

US 9,902,118 B2

RESIN-SOLUBLE VEILS FOR COMPOSITE ARTICLE FABRICATION AND METHODS OF MANUFACTURING THE SAME

CROSS REFERENCE TO RELATED APPLICATION

This application is a Divisional Application of application Ser. No. 13/307,383 filed Nov. 30, 2011, which claims the benefit of U.S. Provisional Patent Application No. 61/418,473 filed Dec. 1, 2010, the disclosure of which is incorporated by reference in its entirety.

FIELD OF INVENTION

Methods of manufacturing resin-soluble veils for composite article manufacturing.

BACKGROUND OF INVENTION

Liquid resin infusion (LRI) is a process used to manufacture fiber-reinforced composite articles and components for use in a range of different industries including the aerospace, transport, electronics, building and leisure industries. The general concept in LRI technology involves infusing resin into a fiber reinforcement, fabric or a pre-shaped fibrous reinforcement ("preform") by placing the material or preform into a mold (two-component mold or single-sided mold) and then injecting resin under high pressure (or ambient pressure) into the mold cavity or vacuum bag sealed single-sided mold. The resin infuses into the material or preform resulting in a fiber-reinforced composite article. LRI technology is especially useful in manufacturing complex-shaped structures which are otherwise difficult to manufacture using conventional technologies. Variation of liquid resin infusion processes include, but are not limited to, Resin Infusion with Flexible Tooling (RIFT), Constant Pressure Infusion (CPI), Bulk Resin Infusion (BRI), Controlled Atmospheric Pressure Resin Infusion (CAPRI), Resin Transfer Molding (RTM), Seemann Composites Resin Infusion Molding Process (SCRIMP), Vacuum-assisted Resin Infusion (VARI) and Vacuum-assisted Resin Transfer Molding (VARTM).

Since most resin infusion systems are inherently brittle, the viscosity levels necessary to achieve the injection process preclude the use of toughening agents. Said differently, the properties of toughness and low viscosity are mutually exclusive in conventional resin infusion systems. Addition of such tougheners to LRI systems generally results in an unacceptable increase in the viscosity of the resin and/or reduction in resistance of the cured material to solvents. These limitations render the addition of tougheners conventionally added in prepregs generally unsuitable in LRI applications.

One method to increase the toughness in composite articles manufactured by liquid resin infusion processes involves the use of non-woven veils of resin-soluble thermoplastic interposed between plies of dry structural reinforcement fiber. The veil may be comprised of a random mat of continuous or chopped polymer fibers. The fibers may be yarns or monofilaments of spun strands. When interleafed with one another, the layers of plies and veils form a preform. When the preform is positioned in a mold and injected with a curable resin, the resin-soluble thermoplastic veil at least partially dissolves throughout resulting in a toughened composite article.

Prior art resin-soluble thermoplastic veils are known to suffer from various shortcomings including bulkiness, low strength, uneven fabric areal weight (FAW) and premature dissolution. Variable uniformity of the FAW and certain characteristics of the fibers comprising the veil, e.g., fineness, directly affect the rate of dissolution of the fibers as well as the distribution evenness of the toughening agent in the composite. Bulkiness affects composite manufacture as well as composite cure ply thickness (CPT).

SUMMARY OF INVENTION

A non-woven engineered veil comprised of a plurality of fibers having a diameter of between 10 microns and 16 microns wherein less than 20% of the fibers have a diameter of less than 8 microns, the veil having a fabric areal weight variation of less than 10% across the width of the textile, the veil having a thickness achieved by a calendering process is herein disclosed. The veil may have a fabric areal weight of between 5 grams per square meter and 80 grams per square meter and a thickness of between 20 μm and 90 μm.

A material comprising the plurality of fibers may be a polymer having a native solid phase and adapted to undergo at least partial phase transition to a fluid phase on contact with a component of a curable composition in which the polymer is soluble at a temperature which is less than the temperature for substantial onset of curing of the curable composition and which temperature is less than the inherent melting temperature of the non-woven engineered textile. The polymer may have a melt flow index of between 18 and 38. In one embodiment, the non-woven engineered veil further comprises a plurality of perforations throughout the veil.

The veil may be manufactured by a melt-extrusion process such as melt blown or spunbond. When the process is a melt-blown process, at least one processing parameter of the process may be set to be within a predetermined range, above a predetermined threshold or below a predetermined threshold, wherein at least one processing parameter includes one of melt pump speed, collector rate speed, airflow rate, and airflow temperature.

A method of manufacturing a non-woven engineered veil using a melt-blown process, comprising: (a) increasing a melt pump speed while simultaneously decreasing an airflow rate; (b) loading a material into an extruder wherein the material is a polymer having a native solid phase and adapted to undergo at least partial phase transition to a fluid phase on contact with a component of a curable composition in which the polymer is soluble at a temperature which is less than the temperature for substantial onset of curing of the curable composition and which temperature is less than the inherent melting temperature of a resultant non-woven engineered veil; and (c) causing the polymer to be extruded from a die head in the form of fibers and onto a moving collector, the fibers forming a non-woven engineered veil wherein increasing the melt pump speed while decreasing the airflow rate provides fibers having a diameter of between 10 microns and 16 microns wherein less than 20% of the fibers have a diameter of less than 8 microns, the veil having a fabric areal weight variation of less than 10% across the width of the veil is herein disclosed.

The method may further comprise (d) subjecting the non-woven engineered veil to a calendering process. The veil may have a fabric areal weight of between 5 grams per square meter and 80 grams per square meter and a thickness of between 20 μm and 90 μm. In one embodiment, the method further comprises (e) subjecting the veil to an off-line perforation process, the off-line perforation process effectuated by one of a needle or a laser.

A preform for composite article manufacturing, comprising: (a) at least one structural component comprising reinforcement fibers; (b) at least one non-woven engineered veil contacting the structural component, the veil comprised of a plurality of fibers having a diameter of between 10 microns and 16 microns wherein less than 20% of the fibers have a diameter of less than 8 microns, the veil having a fabric areal weight variation of less than 10% across the width of the veil, the plurality of fibers comprised of polymer having a native solid phase and adapted to undergo at least partial phase transition to a fluid phase on contact with a component of a curable composition in which the polymer is soluble at a temperature which is less than the temperature for substantial onset of curing of the curable composition and which temperature is less than the inherent melting temperature of the non-woven engineered textile is herein disclosed. The polymer may have a melt flow index of between 18 and 38.

The structural component may be in the form of a plurality of adjacent reinforcement fiber layers and the non-woven engineered veil may be in the form of a plurality of resin-soluble thermoplastic veils interposed between pairs of adjacent reinforcement fiber layers. In one embodiment, the preform may be adapted for resin infusion. The veil may have a fabric areal weight of between 5 grams per square meter and 80 grams per square meter and a thickness of between 20 µm and 90 µm as a result of a calendering process. In one embodiment, the preform further comprises a plurality of perforations throughout the veil.

A method of manufacturing a composite article using a liquid resin infusion process, comprising: (a) arranging a plurality of structural components comprising reinforcement fibers within a mold; (b) interleafing a plurality of non-woven engineered veils with the plurality of structural components, the plurality of veils comprised of a plurality of fibers having a mean diameter of between 10 microns and 16 microns wherein less than 20% of the fibers have a diameter of less than 8 microns, and a fabric areal weight variation of less than 10% across the width of the textile, the interleafed arrangement forming a preform; (c) contacting the preform with a resin wherein the resin is at an initial temperature of less than 75° C.; (d) heating the preform to a predetermined temperature threshold wherein a majority of the fibers are dissolved before the predetermined temperature threshold is reached; and (e) allowing the preform to cure while the preform is held at the predetermined temperature threshold for a predetermined time period is herein disclosed.

In one embodiment, the predetermined temperature threshold may be about 180° C. The plurality of fibers may comprise a polymer having a native solid phase and adapted to undergo at least partial phase transition to a fluid phase on contact with a component of a curable composition in which the polymer is soluble at a temperature which is less than the temperature for substantial onset of curing of the curable composition and which temperature is less than the inherent melting temperature of the non-woven engineered veil. The polymer may have a melt flow index of between 18 and 38. The textile may have a fabric areal weight of between 5 grams per square meter and 80 grams per square meter and a thickness of between 20 µm and 90 µm.

DETAILED DESCRIPTION

Figure 1:
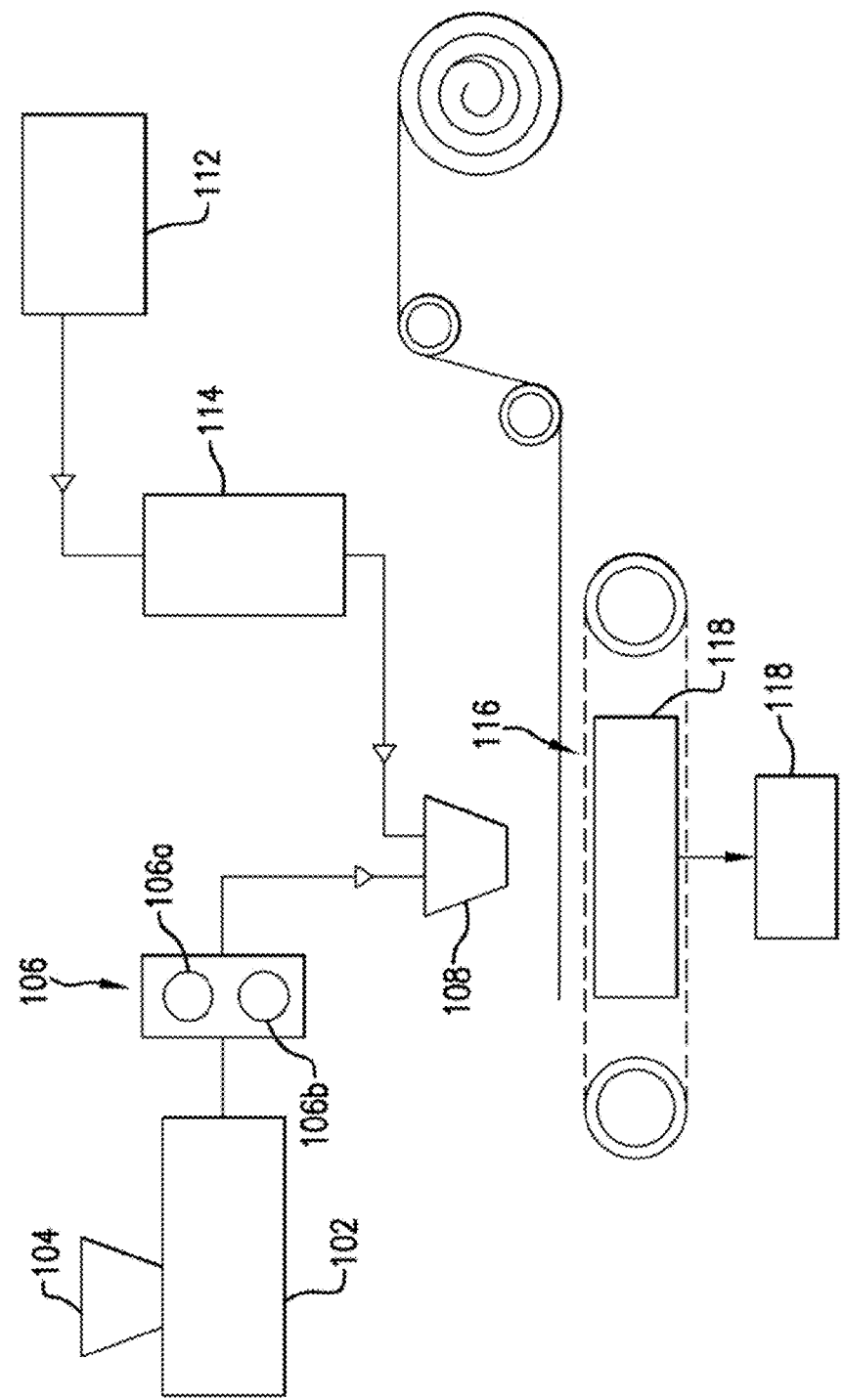
FIG. 1 is a schematic of a meltblowing manufacturing process according to an embodiment of the invention.

The following detailed description is of the best currently contemplated modes of carrying out the invention. The description is not to be taken in a limiting sense, but is made merely for the purpose of illustrating the general principles of the invention.

Embodiments of the invention are directed to non-woven engineered veils, which include non-woven, resin-soluble thermoplastic veils for use in liquid resin infusion processes, methods of manufacturing non-woven engineered veils for use in liquid resin infusion processes, and methods of manufacturing composite articles using non-woven engineered veils for use in liquid resin infusion applications. In addition to functioning as a toughening agent in composites when incorporated therein, the non-woven engineered veils according to embodiments of the invention have improved characteristics including, but not limited to, increased uniformity and decreased thickness relative to prior art veils. These characteristics translate into improvements in the processing of a composite article including, but not limited to, a substantial or complete elimination in premature dissolution of the veil during cure. The resultant composite article also realizes improvements including, but not limited to, distribution evenness of the toughening agent throughout the composite and a reduced composite ply thickness.

In one embodiment, the non-woven engineered veil includes a plurality of resin-soluble thermoplastic fibers having at least one of the following characteristics: (a) substantial uniformity as a result of (i) fibers having a mean diameter within a predetermined range with 20% of the fibers having a diameter of less than a predetermined threshold; and (ii) veil having a fiber areal weight variation within a predetermined range; (b) veil having a thickness within a predetermined range; and/or (c) veil having a permeability characteristic resulting from off-line perforation of the veil.

In one embodiment, a method of manufacturing the non-woven engineered veil is performed by a melt-blown process wherein at least one processing condition and/or equipment condition including, but not limited to, melt pump speed, airflow rate, collector speed, airflow temperature, die head temperature, distance of conveyer to die head and die hole diameter is controlled and/or manipulated within predetermined parameters. In some embodiments, the method is further improved by subjecting the resultant non-woven engineered veil to a calendering process resulting in controlled porosity and improved strength of the veil as well as a reduction in preform bulk factor which is essential in LRI applications. In some embodiments, the method is further improved by subjecting the calendered veil to off-line perforation resulting in increased permeability for increased resin diffusion in LRI applications.

In one embodiment, a method of manufacturing composite articles using the non-woven engineered veil is performed by a resin infusion process wherein the dissolution of the veil is controlled as a result of one or more characteristics of the manufactured veil resulting in substantial or complete elimination of premature dissolution and substantial or complete even distribution of toughening throughout the composite.

In the context of this application, a "veil" is an ultrathin, nonwoven mat comprised of organic fibers and combined with one or more plies to create composite articles. Veils may be used for toughening when interposed between plies of a fabric lay-up. Generally, a "mat" is an nonwoven textile fabric made of fibrous reinforcing material, such as chopped filaments (to produce chopped strand mat) or swirled filaments (to produce continuous strand mat) with a binder applied to maintain form.

In the context of this application, a "resin-soluble polymer" is a polymer in a solid phase within a predetermined temperature range and adapted to undergo at least partial phase transition to a fluid phase upon contact with a component of a curable composition in which the polymer is soluble at a temperature which is less than the temperature for substantial onset of gelling and/or curing of the curable composition and which temperature is less than the inherent melting temperature of the resin-soluble thermoplastic veil. Examples of resin-soluble polymers include those identified in U.S. Pub. No. 2006/0252334 LoFaro et al. which is hereby incorporated by reference.

Methods of manufacturing the non-woven engineered veil according to embodiments of the invention include, but are not limited to, drylaying, airlaying, meltblowing, spunbonding, wetlaying and carding with or without cross-lapping. In one embodiment, the veil according to embodiments of the invention is manufactured through meltblowing.

Generally, a meltblowing manufacturing process begins with a solid phase polymer in powder or granular form. The polymer may be melted at between about 200° C. and 400° C. and extruded through a plurality of spinnerets. The orifice size of the spinneret may be between about 0.1 microns to about 1000 micron. Air having a temperature in the range of about 250° C. to 500° C. may be blown throughout the fibers extruded onto a conveyor from the spinnerets to thin the fibers into super thin fibers and to randomize the fibers into a veil.

FIG. 1 is a schematic of a meltblowing manufacturing process according to an embodiment of the invention. In one embodiment, polymer material (e.g., pellets or granules) is fed into an extruder 102 via an extruder hopper 104. The extruder 102 comprises a barrel and a screw (not shown) within the extruder 102 to rotate the polymer material along the walls of the barrel. Generally, the barrel of the extruder 102 is heated. As the polymer material moves along the walls of the barrel, it melts due to the heat and friction of viscous flow and the mechanical action between the screw and the barrel. Pressured molten polymer material is then fed into the gear pump 106.

The gear pump 106 is a positive displacement and constant volume device for uniform melt delivery to the die assembly 108. Generally, the gear pump 106 ensures consistent flow of molten polymer material and provides metering of and pressure to the molten polymer material. Typically, the gear pump 106 includes two inter-meshing and counter-rotating toothed gears 106a, 106b. Positive displacement results from the filling of each gear tooth with polymer material on the suction entrance of the pump (i.e., upstream following extruder 102) and carrying the polymer material around to the discharge exit of the pump (i.e., downstream towards a die assembly 108).

The die assembly 108 generally includes a feed distribution (e.g., T-type and coat hanger type), a die head and air manifolds. The feed distribution balances both the flow and the residence time of the polymer material across the width of the die; the die head is generally a wide, hollow and tapered piece of metal having several hundred orifices for extruding molten polymer material; the air manifolds supply high velocity air to the molten polymer material as it is being extruded through the die head. An air compressor 112 supplies the high velocity air which generally passes through a heater 114 before being fed into the die assembly 108.

As molten polymer material is forced through the die head of the die assembly 108, a moving collector screen 116 collects the cooling material. A suction box/suction blower 118 located beneath the collector screen 116 sucks the high velocity air which increases the rate of web formation of the resulting extruded polymer fibers.

According to embodiments of the invention, at least one processing condition and/or equipment condition including, but not limited to, melt pump speed, collector speed, airflow rate, airflow temperature, die head temperature, die hole diameter and distance of conveyer to die head may be controlled and/or manipulated within predetermined parameters to produce a non-woven engineered veil for use in resin transfer molding applications. Applicants unexpectedly discovered that the manipulation of one parameter to produce advantageous characteristics of the resultant resin-soluble thermoplastic veil were often interdependent on the manipulation of another parameter. In the context of this application, "advantageous characteristics" include, but are not limited to, coarser fibers, low percentage of fine fibers (i.e., less than 20% of the fibers having a diameter of less than 8 μm), increased fiber uniformity (i.e., a narrower distribution of the measured fiber diameter), low FAW variation (i.e., the change in weight of the veil through a roll or a batch wherein the weight is measured at different locations of the veil including, but not limited to, cross-web and down-web), high veil tensile strength (i.e., the ability of the veil being able to meet certain requirements including, but not limited to, handling and manufacturing) and high veil quality.

Applicants discovered that one or more of these advantageous characteristics resulted in certain benefits to the resultant veil which translates into improved processing of laminates and composites having the veils incorporated therein and manufactured by LRI processes. For example, coarser fibers, a low percentage of fine fibers, increased fiber uniformity and a low FAW variation in the resultant veil resulted in controlled and substantial or complete elimination of the premature dissolution of the veil during a resin infusion process. These characteristics also contributed to the substantial or complete even distribution of toughness to the resultant composite. Additionally, high uniformity and high veil strength resulted in high quality veil (i.e., substantially or completely free of defects) which is a highly desirable characteristic of veils in terms of processability for LRI processes. Moreover, uniform veil and high quality veil results in more uniform and higher quality preform, e.g., little or no tearing of the veil during preform manufacture, uniform ply thickness, etc., directly resulting in more uniform resin infusion, i.e., diffusion of the resin in the part and a smoother and more controlled resin front.

Applicants observed that, for a given (melt-blown) processing system used to manufacture the veil, the setting, control and/or manipulation of certain processing parameters are critical to achieve the targeted advantageous characteristics, in particular, low FAW variation, high veil quality, high veil strength and fiber diameter uniformity. For example, manipulation and control of certain parameters according to embodiments of the invention resulted in a fiber diameter range of between 10 microns and 16 microns as compared to conventional fiber diameters in a range of between 1 micron and 8 microns. Applicants also discovered that by manipulating one processing condition and/or equipment parameter, one or more other processing conditions needed to be considered and/or accounted for in order to achieve a resin-soluble thermoplastic veil with advantageous characteristics according to embodiments of the invention.

In one embodiment, the melt pump speed was increased relative to conventional melt pump speeds. Applicants discovered that a melt pump speed between about fourteen (14) rpm and about sixteen (16) rpm provided advantageous characteristics including, but not limited to, coarser fibers, low percentage of fine fibers (i.e., less than 20% of the fibers having a diameter of less than 8 µm), high FAW, high veil strength and high veil quality. FAW variation (low) was also realized as an improvement, however, not to the same extent of those characteristics previously listed. Applicants also discovered that either an increase or decrease in melt pump speed had a limited influence on increased fiber diameter uniformity. Generally, the increased melt pump speed resulted in increased throughput of the molten polymer material through the die head and less stretch which correlates to coarser fibers.

In one embodiment, the airflow rate was adjusted relative to conventional airflow rates. Applicants discovered that decreasing the airflow rate to between about forty (40) percent (%) and fifty (50) percent (%) provided advantageous characteristics including, but not limited to, coarser fibers and low percentage of fine fibers (i.e., less than 20% of the fibers having a diameter of less than 8 µm). FAW variation (low) and veil quality (high) were also realized as improvements, however, not to the same extent of those characteristics previously listed. Applicants also discovered that increasing the airflow rate to above fifty (50) percent (%) provided limited improvements including, but not limited to, increased fiber diameter uniformity (limited influence) and high veil strength. Applicants also discovered that either an increase or decrease in airflow rate had a limited or no influence on FAW.

In one embodiment, collector rate speed was adjusted as a function of melt pump speed. Applicants observed that decreasing the collector rate speed to between about thirty-five (35) feet per minute (FPM) and forty (40) FPM relative to a melt pump speed between about 12 and 16 rpm provided advantageous characteristics including, but not limited to, coarser fibers, fiber diameter uniformity and a low FAW variation. Conversely, Applicants discovered that increasing the collector speed rate to between about seventy (70) FPM and eighty (80) FPM relative to a melt pump speed between about 12 and 16 rpm provided limited improvements including, but not limited to, low percentage of fine fibers (i.e., less than 20% of the fibers having a diameter of less than 8 µm) and high veil strength. In some embodiments, the collector speed and the melt pump speed may be adjusted in tandem to optimize throughput. It should be appreciated that characteristics were observed for veils targeted between about twenty (20) and forty (40) gsm FAW.

In one embodiment, airflow temperature was adjusted relative to conventional airflow temperatures. Applicants also discovered that increasing the airflow temperature to about 680° F. provided advantageous characteristics including, but not limited to, increased fiber diameter uniformity and low FAW variation. High veil strength was also realized as an improvement, however, not to the same extent of those characteristics previously listed. Conversely, Applicants discovered that decreasing the airflow temperature to about 650° F. provided limited improvements including, but not limited to, coarser fibers and a low percentage of fine fibers (i.e., less than 20% of the fibers having a diameter of less than 8 µm).

According to an embodiment of the invention, an increased melt pump rate combined with a decreased airflow rate (and, in some embodiments, an increase in air temperature) for polymer-based veils having an MFI of between twenty (20) and twenty-eight (28) (explained in more detail below) have the greatest effect on providing non-woven engineered veils having superior characteristics relative to conventional veils. More specifically, a melt pump rate of between 12 and 16 rpm, more narrowly between 14 and 16 rpm, and an airflow rate of between forty (40) % and fifty (50) % provide veils having superior characteristics relative to conventional veils.

Figure 2:
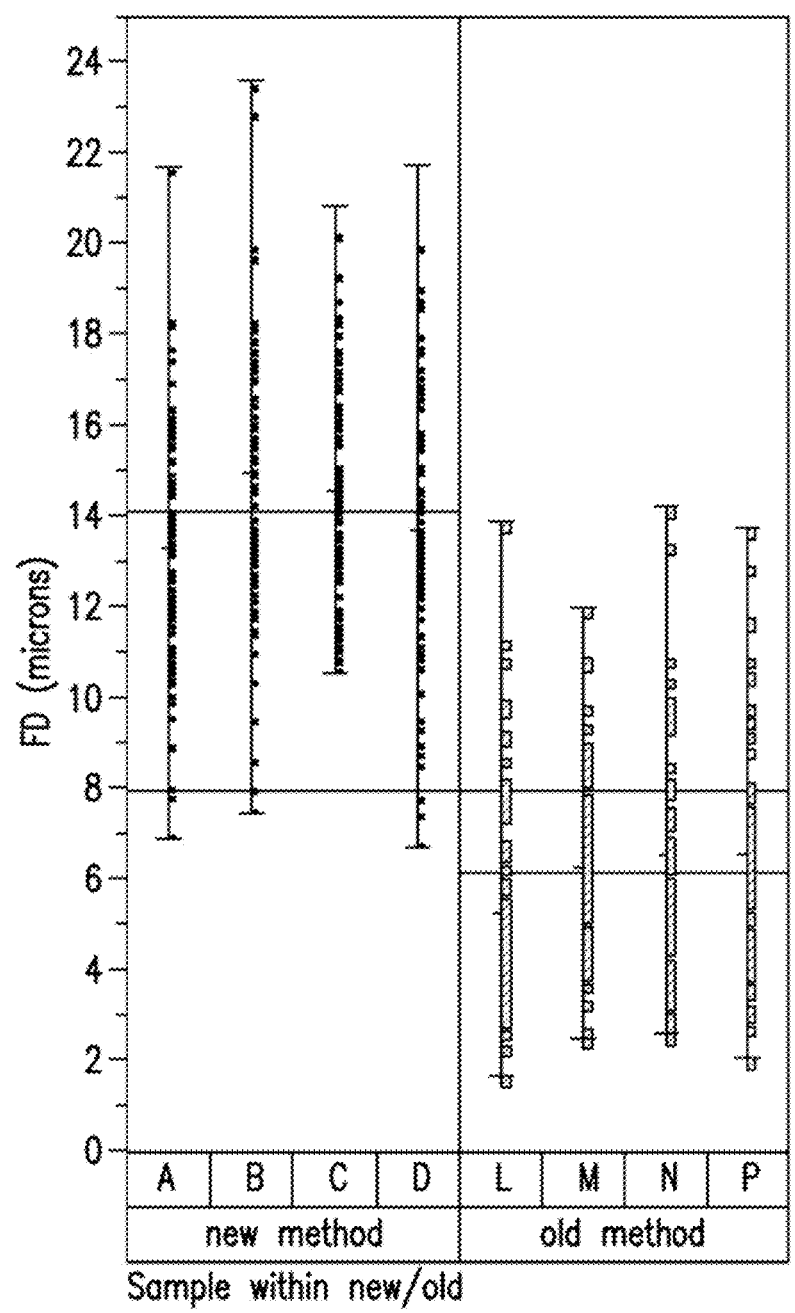
FIG. 2 is a chart comparing veil fiber diameter before and after optimization of the manufacturing process according to embodiments of the invention.

In one aspect, these processing parameters provide non-woven engineered veils having coarser fibers having a mean average fiber diameter greater than ten (10) µm (compared to less than 8 µm of conventional fibers) with a low percentage of fine fibers (i.e., 20% less than 8 µm diameter fibers), more particularly, fibers having a mean diameter of between 10 microns and 16 microns wherein less than 20% of the fibers have a diameter of less than 8 microns (see FIG. 2). Additionally, the distribution of the coarser fibers was more uniform throughout effectively increasing the uniformity of the veil.

Figure 3:
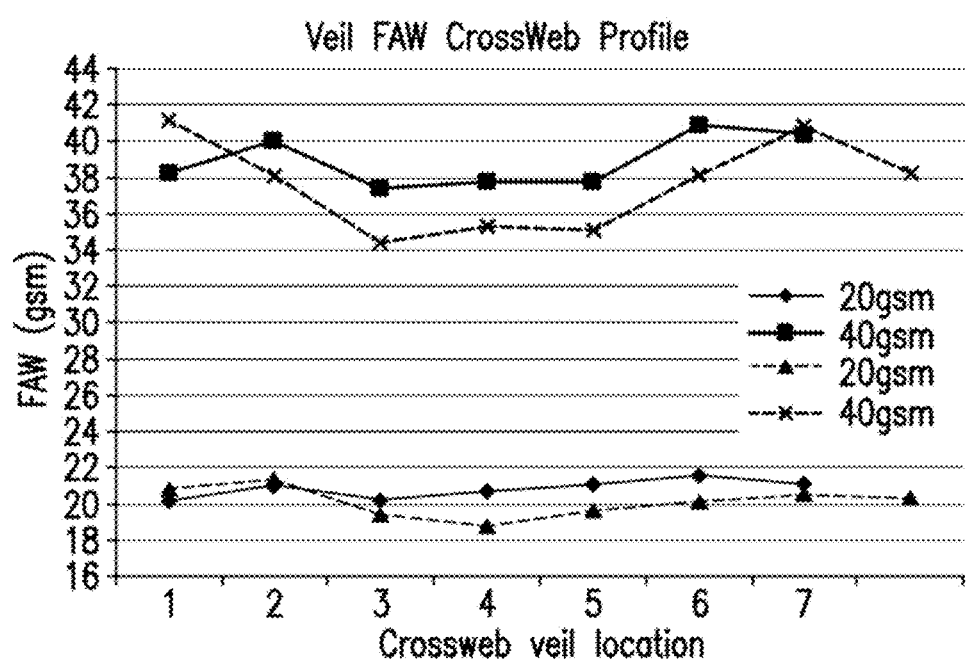
FIG. 3 is a chart comparing veil cross-web FAW profiles across 20 gsm and 40 gsm veils before and after the optimization of the manufacturing process according to embodiments of the invention.

In another aspect, these processing parameters provide non-woven engineered veils having improved uniformity which is measured by the fabric areal weight (FAW) variation. The FAW is measured by measuring the weight of the veil at various points along the width thereof (cross web) or the length thereof (down web). The more closely the values match at each point, the more uniform the veil. The FAW of non-woven engineered veils subjected to at least these processing parameters realized a forty (40) % reduction in FAW variation relative to conventional veils. More particularly, the fabric areal weight variation of less than ten (10) % across the width of the veil (cross web) (see FIG. 3). Veils manufactured according to embodiments of the invention had a FAW of between about five (5) grams per square meter (gsm) and eighty (80) grams per square meter, more narrowly, between about fifteen (15) gsm and sixty (60) gsm, more narrowly, between about twenty (20) gsm and forty (40) gsm.

It should also be appreciated that the processing conditions optimized may be interdependent on equipment characteristics and other parameters including, but not limited to: die characteristics such as die hole diameter, number of die holes per inch, die head temperature (edge), die head temperature (center), die head screen mesh size, die head screen pressure; air gap; set back; extruder characteristics such as extruder speed and extruder temperature; melt pump temperature; collector characteristics such as collector vacuum; distance of die head to collector; coat hanger and die design.

It should also be appreciated that these optimized processing parameters may be dependent on the type of polymer used in manufacturing the non-woven engineered veil as well. In one embodiment, the polymer is a polymer having a characteristic of being in a solid phase and adapted to undergo at least partial phase transition to a fluid phase on contact with a component of a curable composition in which the polymer is soluble at a temperature which is less than the temperature for substantial onset of gelling and/or curing of the curable composition and which temperature is less than the inherent melting temperature of the non-woven engineered veil.

The MFI of the polymer may also affect the dissolution rate. In some embodiments, the polymer has a melt flow index of between about eighteen (18) MFI and about thirty-eight (38) MFI, preferably about twenty (20) MFI and twenty-eight (28) MFI. That is, the polymer has a high viscosity ($\eta$) and, in some embodiments, a narrow molecular distribution throughout. A lower MFI, i.e., between about twenty (20) MFI and twenty-eight (28) MFI, represents a polymer with a higher molecular weight. The effect of this characteristic resulted in a decrease in the dissolution rate of the fibers and a decrease of the degradation of the polymer.

Representative examples of a polymer which may be used to manufacture non-woven engineered veils according to embodiments of the invention include polyaromatic thermoplastic polymers such as polyethersulphone and more preferably a combination of polyethersulphone-etherketone and of polyetherethersulphone.

Table 1 summarizes the processing parameters as pertains to their affects on the non-woven engineered veils manufactured according to embodiments of the invention:

fabrics (NCFs) are plies of unidirectional fibers consolidated together via a stitching process. The resultant layers should be as thin as practicable, referred to as low "preform bulkiness." Low veil thickness is critical as such thickness is a direct function of preform bulkiness. In closed mold RTM applications, preform dimensions should not exceed between five (5) % and ten (10) % of the mold dimensions. Conventional veils add up to twenty (20) % more to preform bulkiness.

According to embodiments of the invention, the non-woven engineered veil can be subjected to a calendering step prior to composite article manufacturing using a resin transfer molding process. In one embodiment, the non-woven engineered veil is subjected to a calender having two steel rollers. Applicants discovered that the two steel rollers (in addition to other characteristics specific to the veil) resulted in a veil with a forty (40) to fifty (50) % decrease in thickness relative to veils experimentally calendered using a conventional calender apparatus having a steel roller and a synthetic roller.

Calendering process parameters also had an effect on the resultant calendered veils as discovered by Applicants. Such calendering process parameters include, but are not limited to: calender pressure; calender temperature; calender speed, etc. For example, Applicants discovered that an increase in pressure to between 500 psi and 860 psi, preferably between 700 psi and 750 psi, relative to lower pressures (i.e., about 300 psi) had a positive effect on the resultant calendered veil. Other calendering process parameters having a positive effect on the resultant calendered veil included a temperature of between 200° F. and 400° F., more narrowly between 200° F. and 300° F. (depending on the calendering speed) and a calendering speed of between five (5) and thirty (30) feet per minute.

The veils subjected to the calendering process as previously described were manufactured according to embodiments of the invention, i.e., non-woven engineered veils having fibers in a range of between ten (10) μm and fourteen

TABLE 1

| Parameters Requirements | Coarse Fiber ∅ | Low % of Fine Fibers | Fiber ∅ Uniformity | High FAW | Low CD FAW Variation | High Veil Strength | High Veil Quality |
|---|---|---|---|---|---|---|---|
| Collector Speed | − | + | − | −− | − | + | − |
| Melt Pump | ++ | ++ | o | ++ | + | ++ | ++ |
| Air Flow | −− | −− | o/+ | o | − | + | − |
| Air Temp | − | − | ++ | o | ++ | + | o/+ |

Figure 4:
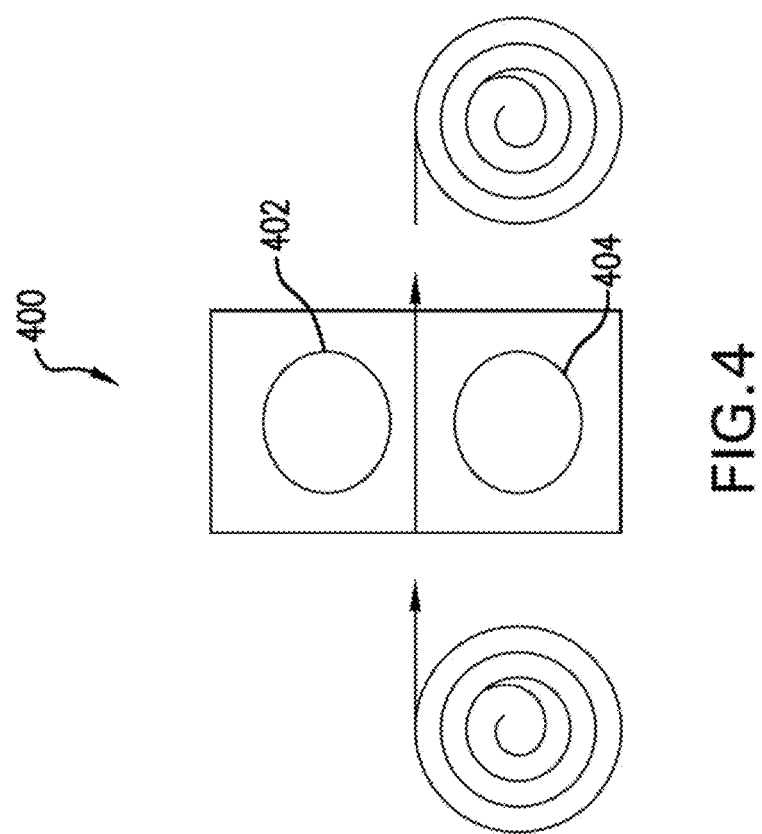
FIG. 4 is a schematic of a calendering process according to an embodiment of the invention.
Figure 5:
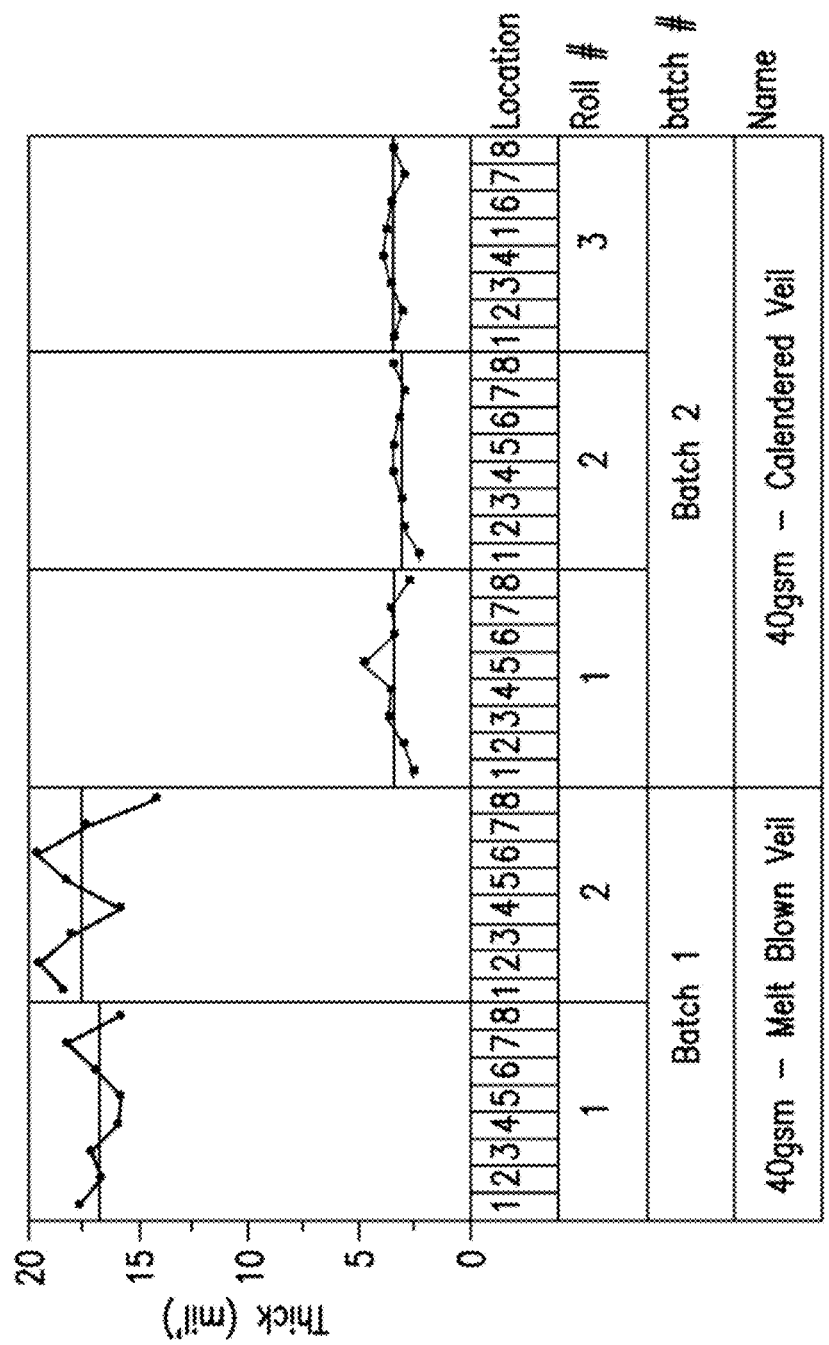
FIG. 5 is a chart comparing a thickness profile across a 40 gsm veil before and after calendering.

++ Great influence; must be set upward to achieve the desired characteristic, for instance, the melt pump speed must be set on high setting to achieve coarser fiber diameters
+ Moderate influence, must be set on high settings to achieve the desired characteristic
o No influence
o/+ Slight influence and must be set toward the high setting to achieve the desired characteristic
−Moderate influence, must be turned low to achieve the desired characteristic
−−Great influence, must be turn low to achieve the desired characteristic FIG. 4 is a schematic of a calendering process according to an embodiment of the invention. In one embodiment, a roll of non-woven engineered veil is run through a calender 400. The calender 400 includes two adjacent rollers 402, 404 in which the engineered textile is passed through. Roller 402 may be made of steel while roller 404 may made of steel or a synthetic material. Calender 400 may include at least one heated nip roll. The combination of applied pressure with temperature to the engineered veil after passing through calender 400 may result a thinner engineered veil relative to the pre-calendered engineered veil.

Veils may be interleafed with non-crimp fabrics or NCFs to form a preform in resin infusion processes. Non-crimped

(16) μm with a low percentage of fine fibers (i.e., 20% or less of fibers having an 8 μm diameter), high tensile strength and substantial FAW uniformity (i.e., a fabric areal weight variation of less than 10% across the width of the textile). These veils had an average FAW of between twenty (20) gsm and forty (40) gsm and were reduced in thickness from between 250 μm and 500 μm (non-calendered) to between twenty (20) μm and ninety (90) μm (calendered) by subjecting the veil to the calendering step as previously described (see FIG. 4).

Figure 6:
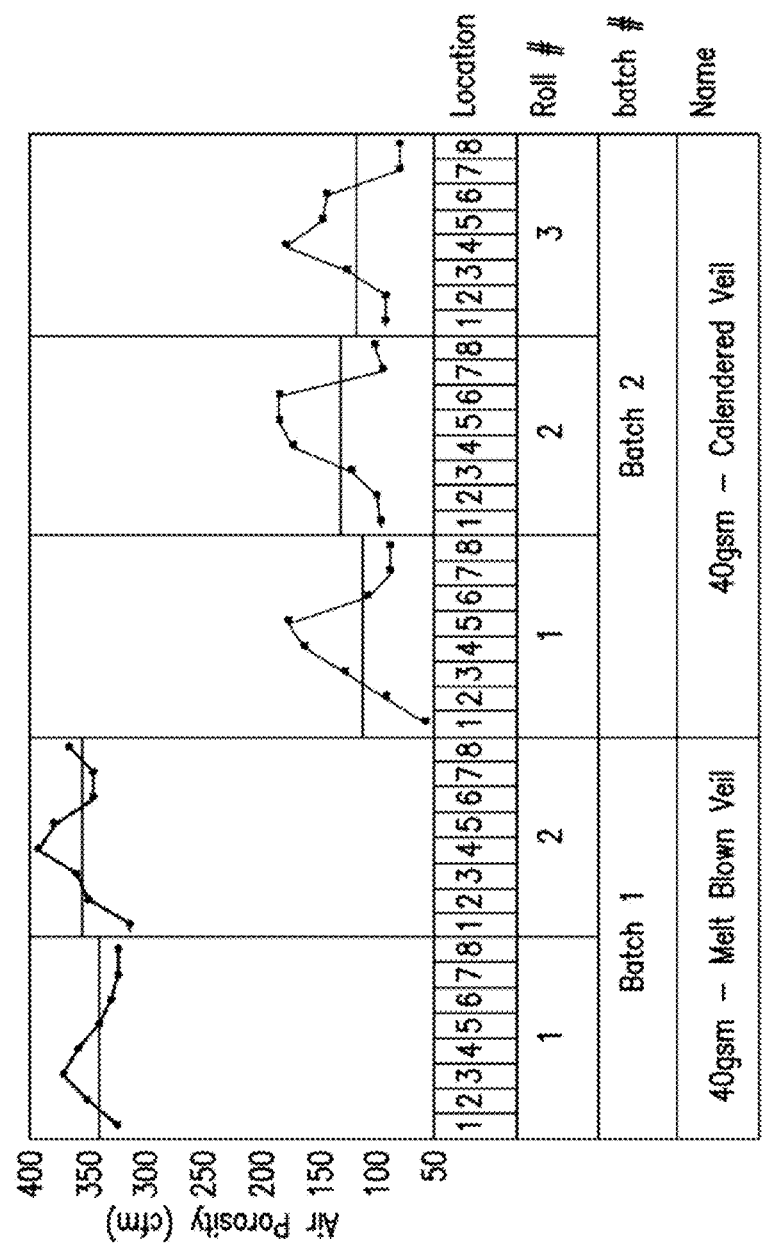
FIG. 6 is a chart comparing an air porosity profile of a 40 gsm veil before and after calendering.

Generally, conventional veils for use in LRI applications were not subjected to calendering because such process was believed to negatively affect air permeability via veil porosity (i.e., decreased porosity) and flexibility of a veil (i.e., decreased flexibility). Porosity of a veil in RTM applications is important because it relates to the ability of the resin to uniformly diffuse throughout the veils layered between textiles in the preform. Flexibility is important because it relates to ease of forming the preform (i.e., drapeability). Applicants unexpectedly discovered that subjecting the non-woven engineered veil manufactured according to embodiments of the invention to a calendering process did not significantly negatively affect porosity or flexibility. For example, for a 40 gsm calendered veil, air permeability was measured at about 175 cfm. For a 20 gsm calendered veil, air permeability was measured at about 500 cfm (see FIG. 6). Generally, the minimum air permeability should be greater than 25 cfm and preferably greater than 50 cfm.

Figure 7:
FIG. 7 are photographs comparing a composite laminate of non-calendered veil, a composite laminate of calendered veil according to embodiments of the invention, and a composite laminate with no veil.

Additionally, Applicants discovered that the calendered veil according to embodiments of the invention resulted in reduced bulk of the veil which translates into a reduced preform bulk factor. This is particularly important in close mold applications such as RTM where preform must fit appropriately in the mold in order for the mold to close (discussed previously). In addition, this reduced preform bulk translates into a composite ply thickness (for a composite that includes a veil per ply layer) equivalent to the composite ply thickness (CPT) of a composite made without a veil (see FIG. 7). Referring to FIG. 7, the picture on the left displays a composite laminate cross-section made of non-calendered veil layers; the picture on the center displays a composite laminate made of calendered veil according to embodiments of the invention; the picture on the right is a composite laminate made without any veil. Comparison of the laminates reveals that there are much reduced interface layers in the case of the calendered veil than for the non-calendered veil. This reduced bulkiness results in composites with higher fiber volume fraction.

Other improvements of the calendered veil according to embodiments of the invention include, but are not limited to: an increase in veil tensile resistance which facilitates handling during preform construction; a smoother veil surface which reduces friction and allows for better lay-up of the carbon tows during NCF construction (discussed in more detail below); and/or a negligible effect on the optimized fiber diameter; and a negligible effect on drapeability. For example, the minimum value of tensile resistance in a 20 gsm non-calendered veil is about 0.1 pound per inch while the minimum value of tensile resistance in a 20 gsm calendered veil according to embodiments of the invention is about 0.3 pounds per inch, or an increase by a factor of three (3).

In some embodiments, the non-woven engineered veils according to embodiments of the invention may be subjected to an off-line perforation technique prior to the manufacture of a composite article (e.g., through incorporation of a non-crimped fabric (NCF) or univeil product) to increase permeability and allow the resin to better diffuse throughout the preform during the resin injection process which in turn increases the through thickness resin diffusion. This is specifically important in the case of the super thin veils which have a low permeability and would not be suitable for certain LRI applications (e.g., VaRTM) as the resin does not flow through the preform medium.

In one embodiment, the perforation can be done at the time of the NCF manufacture when the veil is added to the carbon layers of the NCF. In another embodiment, the perforation of the veil can be done in a separate operation with very tiny needles that puncture the veil to create tiny holes. The perforation may have a hole diameter of between 0.1 mm and 2.0 mm, and a hole density of between 1 and 100 per $cm^2$ depending on the desired permeability. Examples of off-line perforation techniques include, but are not limited to, needle punching, roller pinning and laser perforation. In another embodiment, a laser beam is used to vaporize or burn off the material to create tiny holes. Hole geometry and density can easily be manipulated with this laser technique.

Non-woven engineered veils fabricated as previously described may be used in the manufacture of a curable composition resulting in a composite article. Generally, such manufacturing comprises contacting a veil with a curable resin matrix for example by interleaving, impregnating, injecting or infusing, mixing and the like. In one embodiment, the veil is contacted with a resin (i.e., an epoxy) by injection such as used in LRI applications. Fibers comprising the veil typically dissolve throughout during a cure cycle.

Premature dissolution during a ramp-up phase of a cure cycle is a known limitation of conventional veils. In the context of this Application, "dissolution" refers to the dissolving of fibers in the non-woven engineered veil during the cure cycle, i.e., after the veil is contacted with resin and heat is applied thereto. Premature dissolution occurs when dissolution occurs below the resin injection temperature.

Figure 8:
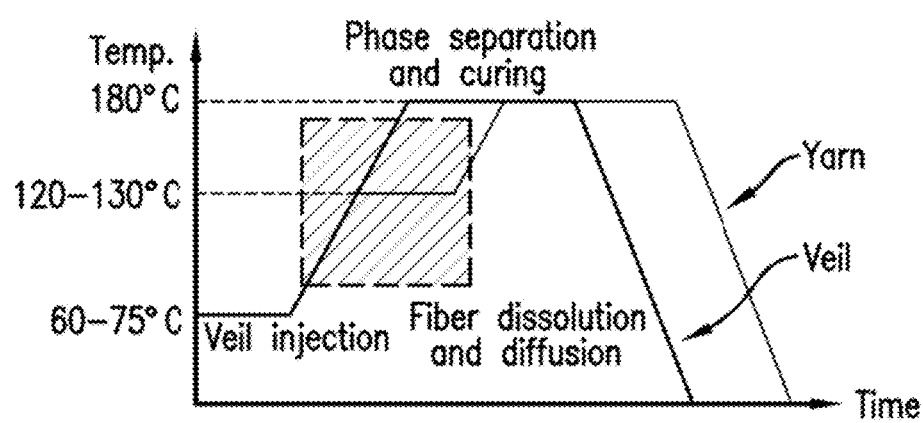
FIG. 8 is graph comparing a resin injection cycle of a thermoplastic resin-soluble yarn and a thermoplastic resin-soluble according to embodiments of the invention.

In an LRI process which includes thermoplastic resin-soluble yarn fibers interwoven with plies, the cure cycle typically includes a temperature ramp-up time period followed by a temperature dwell time period followed by a temperature ramp-down time period after injection of the resin (see FIG. 8). A substantial amount of dissolution of the yarn fibers is known to take place during the dwell time period. Dissolved yarn fibers become the toughening agent in the resultant composite article.

Figure 9:
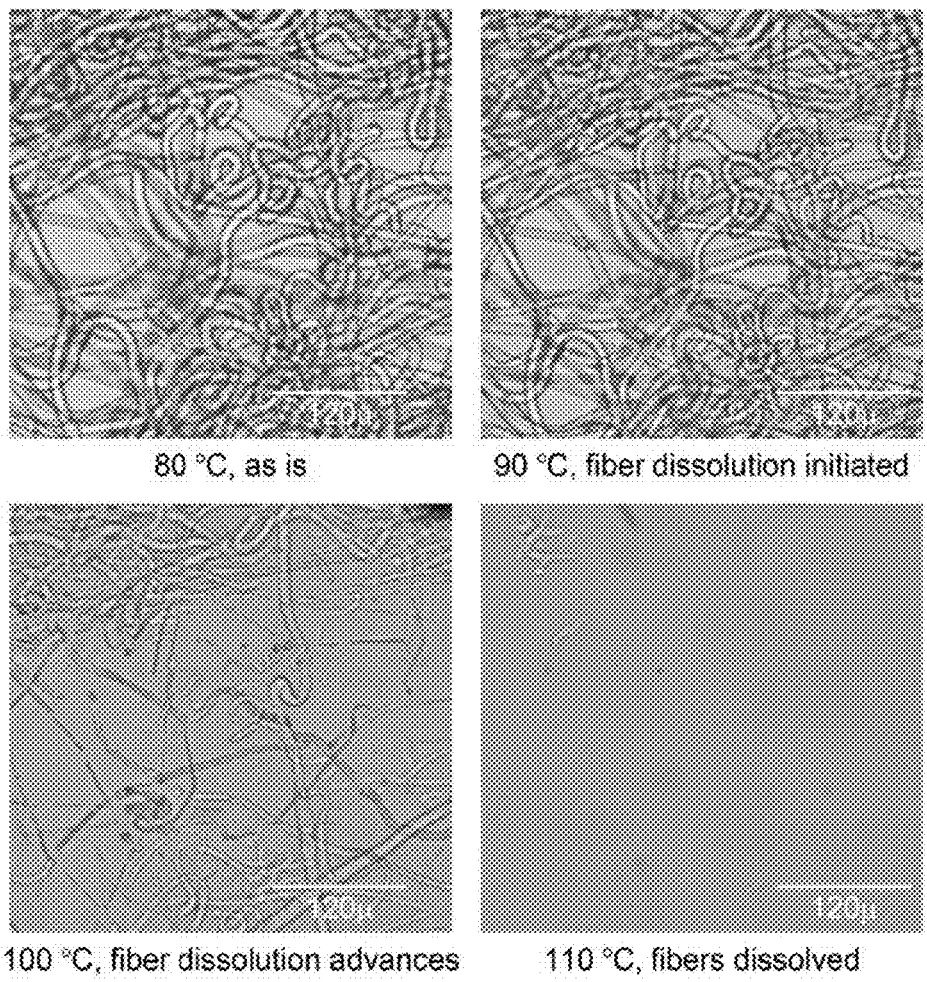
FIG. 9 are photographs of the dissolution of fibers of a veil according to embodiments of the invention.

During a resin injection and cure experiment, it was observed that non-woven engineered veils manufactured according to embodiments of the invention and contacted with resin dissolved during a ramp-up time period (e.g., 2° F./minute, 8° F./minute, etc.) of a cure cycle in contrast to during a dwell time period of a comparable set-up, i.e., thermoplastic resin-soluble interwoven yarn fibers (see FIG. 8). FIG. 9 show optical microscope photographs of the dissolution of the veil fibers during cure cycle temperature ramp up according to embodiments of the invention. At 80° C., the resin temperature has been initiated and the veil is undissolved. As temperature increases, the veil fibers dissolve slowly. All fibers are fully dissolves at 110° C. As a result, the shorter resin injection cure increased production (i.e., reduced manufacturing time) resulting to lower manufacturing costs.

Applicants also ascertained that dissolution of the fibers occurred at a suitable margin above the injection temperature (e.g., between 60-75° C.) as compared to conventional veils. Premature dissolution can compromise the integrity of the resulting composite article and, therefore, a substantial or complete elimination in premature dissolution of the veil during cure is highly beneficial.

Figure 10:
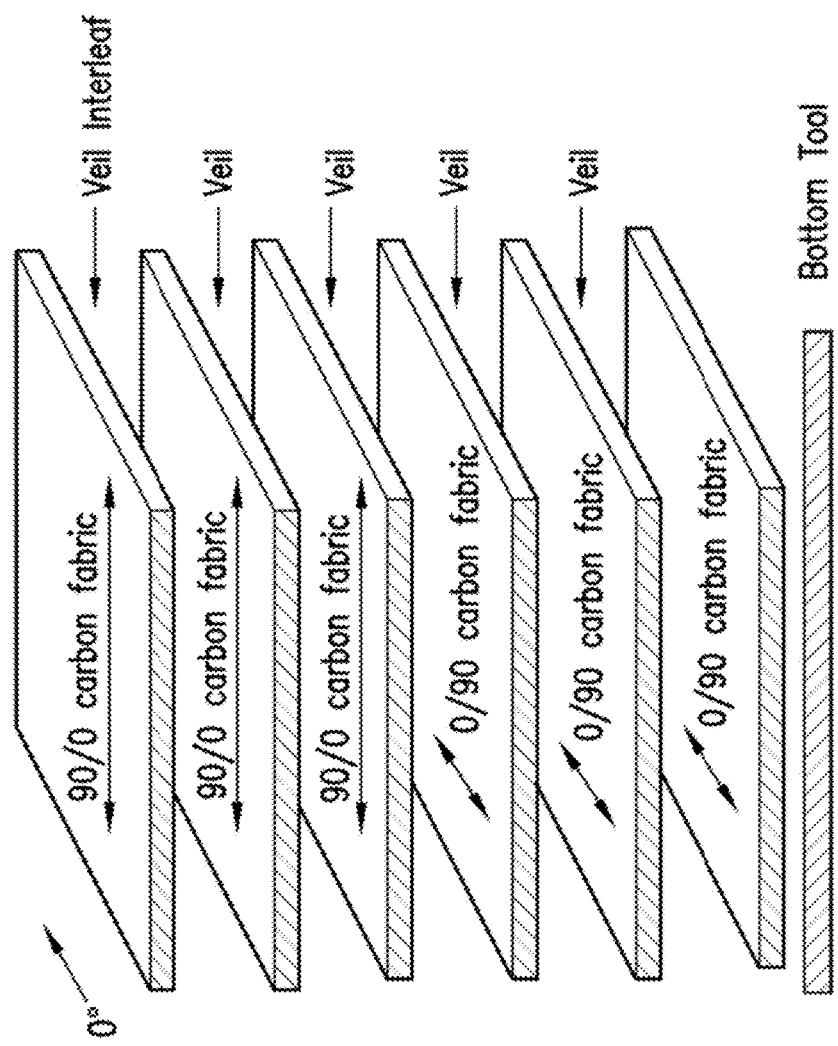
FIG. 10 illustrates a lay-up of structural components and resin-soluble thermoplastic veils according to an embodiment of the invention.

FIG. 10 illustrates a lay-up of structural components and non-woven engineered veils according to an embodiment of the invention. In the context of this application, a "structural component" is an engineered fabric made of reinforcing fibers such as organic and inorganic polymers, carbon, glass, Aramid™. Examples of suitable fabric types or configurations include, but are not limited to: woven fabrics such as polar weaves, plain woven fabrics, spiral weaves and uni-weaves; multi-axial fabrics such as multi-warp knitted fabrics, non-crimp fabrics (NCF) and multi-directional fabrics;

knitted fabrics braided fabrics; tailored fiber placement fabrics such as fiber placement and embroidered fabrics; non-woven fabrics such as mat-fabric, felts, veils and chopped strands mats and fabrics that are comprised of combinations thereof. As shown in FIG. 10, a plurality of carbon fabrics can be interleafed with a plurality of resin-soluble thermoplastic veils according to an embodiment of the invention in an RTM tool to create a preform. A resultant composite article results when subjected to a liquid resin infusion process as previously described.

Non-woven engineered veils manufactured according to embodiments of the invention as previously described resulted in numerous advantages relative to conventional veils. For example, it was observed that controlled veil fiber diameter and distribution, achieved through process optimization, provided at least the following benefits: a shorter resin injection cure cycle of thermoplastic veils manufactured according to embodiments of the invention relative to yarn-based thermoplastic material; a controlled dissolution process (i.e., premature dissolution is eliminated through a careful fiber diameter selection in a range of 10 to 16 microns and resin injection temperature of 60 to 75° C.); a greater FAW uniformity of the veil translating into improved composite article characteristics and performance through a more uniform dissolution of the fibers and therefore diffusion of the toughening agent.

Additionally, it was observed that reduced veil thickness, achieved through a calendering step, provides at least the following benefits: veils with a thickness ranging between 20 to 90 µm, compared to non-calendered veils with a thickness ranging between 250 and 500 µm; veils that retain nonwoven characteristics such as being porous and flexible (i.e. not like a film); reduced preform bulk factor (particularly important in close mold applications such as RTM); and CPT equivalent to a composite made without a veil.

Additionally, it was observed that controlled fiber areal weights (FAW) both down web and cross web, achieved through process optimization, provided at least the following benefits: greater uniformity of the non-woven veil (e.g. strength, thickness, air permeability), translating in improved veil characteristics and performance; a more uniform distribution of the toughening fibers throughout the resultant composite article and improved composite performance.

Additionally, Applicants discovered that the combination of the controlled fiber diameter with a thin veil resulted in: no effect on resin diffusion and veil dissolution (critical in the case of complex and or large parts); no (significant) effect on preform drapeability (critical in the case of complex parts); the ability to better control the veil permeability.

While certain exemplary embodiments have been described and shown in the accompanying drawings, it is to be understood that such embodiments are merely illustrative of and not restrictive on the broad invention, and that this invention is not to be limited to the specific constructions and arrangements shown and described, since various other modifications may occur to those ordinarily skilled in the art.

What is claimed is:

1. A method of manufacturing a composite article using a liquid resin infusion process, comprising:
    manufacturing at least one non-woven veil comprised of a plurality of resin-soluble thermoplastic fibers having a mean diameter of between 10 microns and 16 microns, wherein less than 20% of the fibers have a diameter of less than 8 microns, and the non-woven veil has a fabric areal weight variation of less than 10% across the width of the veil;
    calendaring the nonwoven veil to produce a calendared veil with a thickness of between 20 µm and 90 µm and a fabric areal weight of between 5 grams per square meter and 80 grams per square meter;
    forming a preform comprising multiple layers of reinforcement fibers and the at least one non-woven veil interleaved between two layers of reinforcement fibers;
    infusing the preform with a curable composition, which has an initial temperature of less than 75° C.;
    heating the preform to a temperature threshold wherein a majority of the fibers in the non-woven veil are dissolved before the temperature threshold is reached; and
    allowing the preform to cure while the preform is held at the temperature threshold for a time period,
    wherein the resin-soluble thermoplastic fibers of the non-woven veil are formed from a thermoplastic polymer that undergoes at least partial phase transition to a fluid phase on contact with a component of the curable composition in which the thermoplastic polymer is soluble at a temperature which is less than the temperature for substantial onset of curing of the curable composition and which temperature is less than the inherent melting temperature of the non-woven veil.

2. The method of claim 1, wherein the temperature threshold is 180° C.

3. The method of claim 1, wherein the resin-soluble thermoplastic fibers of the non-woven veil are formed from a polyaromatic thermoplastic polymer.

4. The method of claim 1, wherein the non-woven veil is manufactured by a melt-blown process, which comprises extruding the thermoplastic polymer through a die head to form fibers and collecting the extruded fibers on a moving collector.

5. The method of claim 1, further comprising subjecting the non-woven veil to an off-line perforation process prior to forming the preform.

* * * * *